Nov. 15, 1966   W. R. FURBECK ET AL   3,285,487

SPREADER BAR HAVING ROLLERS THEREON

Filed Jan. 19, 1965

3,285,487
SPREADER BAR HAVING ROLLERS THEREON
Warren R. Furbeck, Knoxville, and Philip H. Murphy, Mosheim, Tenn., assignors to Huyck Corporation, Stamford, Conn., a corporation of New York
Filed Jan. 19, 1965, Ser. No. 426,640
13 Claims. (Cl. 226—190)

This invention relates to spreader bars for expanding or contracting sheet materials and, more particularly, for expanding or contracting traveling sheets of fabric, paper, film, or the like.

In the processing of fabrics, papers, films, and the like materials, it is often desirable to spread or expand the material to make the material more uniform, to remove wrinkles, or for many other purposes, as the material travels from one processing station to another. Conversely, with some materials, it is sometimes desirable to contact or compress the material widthwise as it travels between processing stations.

One method often employed to expand or compress such materials is to pass the material over a bar or roll which is curved or arcuated, along its axis, across the path of the material feed. Where the material is to be expanded, such a bar or roll is usually arcuated in the direction of travel of the material. Where the width of the material is to be contracted, the bar or roll is usually arcuated in the opposite direction. For purposes of the following description, such bars will be referred to as "spreader bars," it being understood that the described bar may be employed for spreading or contracting depending on the direction of travel of the material.

One of the difficulties customarily encountered in the use of spreader bars is in controlling the position of the traveling material. As the material is fed across the arched bar, the bar applies opposing forces to the material, widthwise of the material. For example, assuming the spreader bar is arcuated in the direction of material travel and the material and bar are in alignment, as the material passes over the bar the material on the right-hand side of the center of the material is pulled toward the right and the material on the left-hand side of the center line is pulled toward the left. These forces, in opposite directions, spread the fabric.

So long as the arched bar and the traveling material are maintained in alignment, the forces applied by the bar are equalized or balanced and the material is spread, widthwise, without difficulty. However, once the material and the bar are misaligned, the forces applied to the material are out of balance and the bar tends to apply a greater force to one side of the material than the other. Thus, the bar guides the material toward the side of the bar applying the greater force, increasing the force differential and ultimately guiding the material off the edge of the bar, against the bearing and stationary parts of the machine. This not only leads to damage to the material but disrupts normal treatment.

One of the objects of the instant invention is to provide an improved bar for spreading or contracting materials.

A further object of the invention is to provide such a bar which will permit misalignment of material without the bar further misaligning the material.

A still further object is to provide such a bar which will apply opposing forces to the material across the material width within reasonable limits of misalignment.

These, and other objects, will be apparent from the following description and drawings in which.

Figure 1:
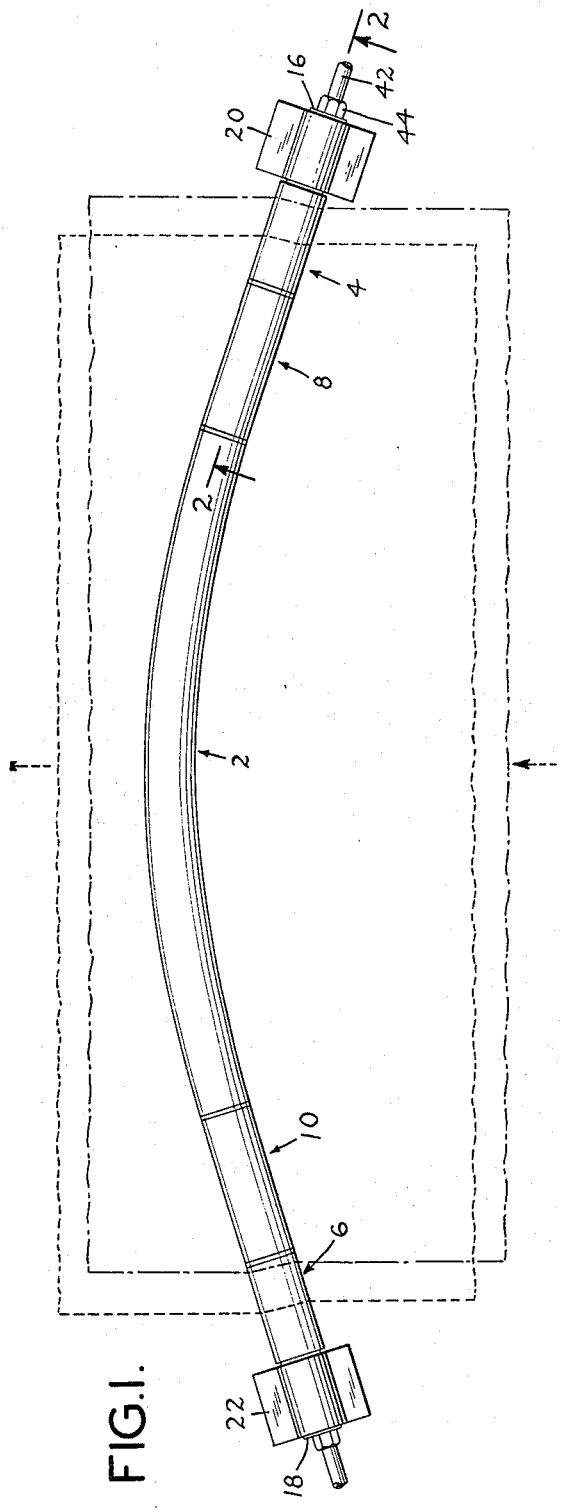
FIG. 1 is a top plan view of the spreader bar of the instant invention.

Referring now to the drawings, the spreader bar of the present invention has an arcuate, center, stationary section generally designated 2, outer stationary members generally designated 4, 6, and intermediate rotatable members generally designated 8, 10.

Arcuate, center section 2 is a tube of stainless steel or of other material with a wear-resistant surface having a low coefficient of friction. The tubular section 2 is stationary and is mounted at its opposite ends on collars 14, fixed to shafts 16, 18 mounted by clamps 20, 22 on suitable supports, not shown. Shafts 16, 18 are in axial alignment with the ends of center section 2.

The opposite ends of the spreader bar of the instant invention are identical. Hence, in the following description only one end of the bar will be described, it being understood that the opposite end is identical with the described structure.

Figure 2:
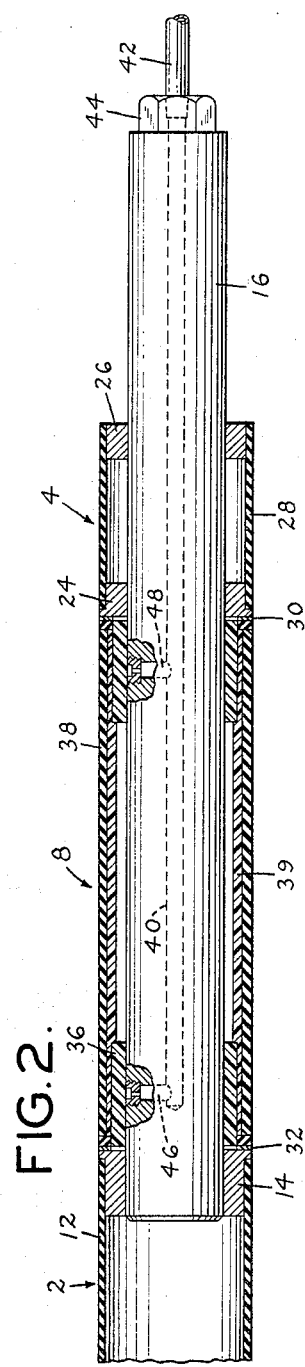
FIG. 2 is an enlarged view, partially in section, along line 2—2 of FIG. 1.

Referring now particularly to FIG. 2, outer stationary member 4 is mounted in stationary, fixed position on shaft 16 by collars 24, 26. Member 4 is a stainless steel tube or other material with a wear-resistant surface having a low coefficient of friction similar to the surface of center section 2. Member 8 is mounted for rotation on shaft 16 intermediate collars 14, 24, thrust bearing 30, 32 being positioned at the opposite ends of member 8.

Rotatable member 8 has an inner tubular frame 39 provided with a cover or surface 38, the cover or surface 36 being of a wear-resistant material, such as, rubber, plastic, or roughened metal, with a high coefficient of friction. Frame 39 and cover 38 are mounted for rotation on shaft 16 by bearings 36 which may be of teflon or any other suitable bearing material. Lubrication passage 40 extends from the outer end of shaft 16 into the shaft, passage 40 being fed lubricant, such as, water, air, or other lubricant compatible with the environment in which the spreader bar is being used, through tube 42 connected to the end of shaft 16. Passages 46, 48 feed lubricant from passage 40 to bearings 36.

As best shown in FIG. 1, in spreading operation the spreader bar of the invention is positioned so that it is in an arched path across the direction of travel of the web material, the arch of the bar extending in the direction of the travel of the material, shown by the arrows in FIG. 1. The spreader bar is elevated slightly, into the path of the web material, so that the web material will wrap or be in contact with an arcuate portion of the bar. A wrap of about 15° has been found suitable for most web materials. The web material is pulled over the spreader bar by driving rolls, not shown.

In the normal feed of the web material, the web material is positioned in axial alignment with the spreader bar as represented by the dotted lines in FIG. 1. As the material passes over the spreader, the material rotates the rotatable members 8, 10 which, by their rotation, angular disposition relative to the path of material travel, and high coefficient of friction surfaces, apply outward forces to the material, spreading or widening the material. The marginal edges of the web material are positioned on the outer stationary members 4, 6. Since each of the rotatable members 8, 10, is of equal length and in engagement with the web along their full length, equal spreading action is applied to either side of the material. Should the web material be misguided by the driving rolls and misaligned on the spreader bar, for example, to the dot-dash position of FIG. 1, the spreading action of the bar is not adversely affected nor does the spreader bar further misguide the material. Since the outer edges of the material pass over stationary members 4, 6, the alignment of the material can be varied without affecting the balance between the spreading action of rotating members 8, 10. Thus, spreading action can be continued until the misguiding condition of the driving rolls, not shown, is corrected.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A bar for applying opposing forces transverse to the path of travel of a sheet of material passed over said bar, said bar comprising an arcuate, stationary center member, outer straight stationary members mounted in axial alignment with the ends of said arcuate member at the opposite ends thereof, and rotatable members mounted intermediate said arcuate member and each of said stationary members, said rotatable members being in axial alignment with the end of said arcuate, stationary member and said outer stationary member and being mounted for rotation about said axis, said axis being angularly disposed to the path of travel of a sheet of material passed over said bar.

2. A bar as recited in claim 1 in which said rotatable members are covered with a wear-resisting covering having a relatively high coefficient of friction.

3. A bar as recited in claim 2 in which said cover is rubber.

4. A bar as recited in claim 1 in which said bar has means at its opposite ends for mounting said bar in fixed position transverse to the path of travel of a sheet of material passed over said bar.

5. A bar for applying opposing forces transverse to the path of travel of a sheet of material passed over said bar, said bar comprising an arcuate, non-rotatable center member, a pair of shafts each fixed to one end of said center member is axial alignment with, and extending axially away from, the ends of said center member bar, a stationary member fixed to each of said shafts, said stationary member being in axial alignment with said shaft and the end of said arcuate member, and a rotatable member on each of said shafts, said rotatable member being in axial alignment with said stationary member and the end of said arcuate member and being mounted for rotation on said shaft intermediate the end of said center member and said stationary member.

6. A bar as recited in claim 5, said shafts having spaced bearings and said rotatable member on each of said shafts being mounted for rotation on said bearings.

7. A bar as recited in claim 6, each of said shafts having a lubrication passage, said passage extending axially of said shafts, passages extending from said lubricating passage to said bearing and means for supplying lubricant to said passage and said bearings.

8. A bar as recited in cailm 7 in which said rotatable members are covered with a wear-resisting covering having a relatively high coefficient of friction.

9. A bar as recited in claim 7 in which said cover is rubber.

10. A bar as recited in claim 7 in which said bar has means at its opposite ends for mounting said bar in fixed position transverse to the path of travel of a sheet of material passed over said bar.

11. A bar for applying opposing forces transverse to the path of travel of a sheet of material passed over said bar, said bar comprising an arcuate, non-rotatable center member having a wear-resistant surface with a relatively low coefficient of friction, outer straight stationary members having a wear-resistant surface with a low coefficient of friction, said outer members being mounted in axial alignment with the ends of said arcuate member at the outer ends therof, and rotatable members mounted intermediate the ends of said arcuate member and each of said stationary members, said rotatable members being in axial alignment with the ends of said arcuate, stationary member and said outer stationary member and being mounted for rotation about said axis, said rotatable members having a wear-resistant surface with a relatively high coefficient of friction.

12. A bar as recited in claim 11 in which said wear-resistant surfaces with a relatively low coefficient of friction are of stainless steel.

13. A bar as recited in claim 12 in which said wear-resistant surface with a relatively high coefficient of friction is rubber.

References Cited by the Examiner

UNITED STATES PATENTS

| | | | |
|---|---|---|---|
| 754,797 | 3/1904 | Ostrander | 26—63 |
| 1,680,190 | 8/1928 | Wikle | 226—15 |
| 2,024,618 | 12/1935 | Whiting | 226—88 |
| 2,925,640 | 2/1960 | Morrow | 26—63 |

ROBERT B. REEVES, *Primary Examiner.*

WALTER SOBIN, *Examiner.*